United States Patent
Lehner et al.

(10) Patent No.: US 7,076,347 B2
(45) Date of Patent: Jul. 11, 2006

(54) BRAKE BOOSTER VACUUM SENSOR DIAGNOSTIC

(75) Inventors: Chad W. Lehner, Howell, MI (US); Daniel H. Hooker, Livonia, MI (US)

(73) Assignee: General Motors Corporation, Detroit, MI (US)

( * ) Notice: Subject to any disclaimer, the term of this patent is extended or adjusted under 35 U.S.C. 154(b) by 216 days.

(21) Appl. No.: 10/763,629

(22) Filed: Jan. 23, 2004

(65) Prior Publication Data

US 2005/0165522 A1    Jul. 28, 2005

(51) Int. Cl.
*G06F 17/00* (2006.01)
*F02D 17/02* (2006.01)

(52) U.S. Cl. .................. 701/34; 701/35; 701/101; 701/107; 303/122.09

(58) Field of Classification Search .......... 701/34, 701/101, 102, 103, 107, 70, 85, 29, 31, 35; 303/122.09, 122.05, 113.3, 115.3; 123/383, 123/389, 399
See application file for complete search history.

(56) References Cited

U.S. PATENT DOCUMENTS

| | | | | |
|---|---|---|---|---|
| 5,954,406 | A | * | 9/1999 | Sawada .................. 303/122.09 |
| 6,289,271 | B1 | * | 9/2001 | Isono et al. .................... 701/31 |
| 6,863,048 | B1 | * | 3/2005 | Burkhard et al. ........... 123/325 |
| 2001/0020800 | A1 | * | 9/2001 | Isono et al. ............... 303/113.1 |
| 2005/0172934 | A1 | * | 8/2005 | Allen et al. .................. 123/399 |

FOREIGN PATENT DOCUMENTS

DE          10256087        8/2003

* cited by examiner

*Primary Examiner*—Tan Q. Nguyen
(74) *Attorney, Agent, or Firm*—Christopher DeVries

(57) ABSTRACT

A diagnostic system for a brake booster sensor includes a monitor that monitors a maximum error and a minimum error based on a brake booster sensor signal over a monitoring period. A first comparator determines one of a pass status and a fail status of the brake booster sensor based on the maximum error and the minimum error.

25 Claims, 3 Drawing Sheets

BRAKE BOOSTER VACUUM SENSOR DIAGNOSTIC

FIELD OF THE INVENTION

The present invention relates to vehicles with brake booster vacuum sensors, and more particularly to diagnostics for brake booster vacuum sensors.

BACKGROUND OF THE INVENTION

Vehicles such as automobiles and trucks include an internal combustion engine (ICE) that produces drive torque that accelerates the vehicle. The vehicle also includes a brake system that decelerates the vehicle. Brake systems include a brake booster that reduces braking effort by applying additional force to a master cylinder of the brake system. The brake booster uses a vacuum to apply force to the master cylinder. The brake booster vacuum is supplied by vacuum from the ICE.

Some ICE's include engine control systems that deactivate cylinders under low load situations. For example, an eight cylinder engine can be operated using four cylinders to improve fuel economy by reducing pumping losses. This process is generally referred to as displacement on demand or DOD. As used herein, activated refers to operation using all of the engine cylinders. Deactivated refers to operation using less than all of the cylinders of the engine (one or more cylinders not active).

A vehicle incorporating a DOD ICE and a brake booster requires a brake booster vacuum sensor to ensure that adequate vacuum is available for braking. If brake booster vacuum falls below a predetermined while in the deactivated mode, the ICE is transitioned to the activated mode to replenish the brake booster vacuum. A faulty brake booster sensor may prevent the ICE from transitioning to the deactivated mode and/or may cause the ICE to cycle in and out of DOD mode.

SUMMARY OF THE INVENTION

Accordingly, the present invention provides a diagnostic system for a brake booster sensor. The diagnostic system includes a monitor that monitors a maximum error and a minimum error based on a brake booster sensor signal over a monitoring period. A first comparator determines one of a pass status and a fail status of the brake booster sensor based on the maximum error and the minimum error.

In one feature, the maximum error is a maximum difference between the brake booster sensor signal and an engine vacuum signal.

In another feature, the minimum error is a minimum difference between the brake booster sensor signal and an engine vacuum signal.

In another feature, the diagnostic system further includes an error reduction fraction (ERF) calculator that determines an ERF based on the maximum error and the minimum error. The first comparator compares the ERF to a threshold to determine one of the pass status and the fail status. If the ERF is less than the threshold, the first comparator generates a fail status signal. If the ERF is equal to the threshold, the first comparator generates a pass status signal.

In still another feature, the diagnostic system further includes a second comparator that generates a first diagnostic enable signal based on an engine vacuum and a brake booster vacuum. The second comparator generates the first diagnostic enable signal if the brake booster vacuum is less than the engine vacuum.

In yet another feature, the diagnostic system further includes a third comparator that generates a second diagnostic enable signal based on a throttle position and a throttle position minimum. The third comparator generates the second diagnostic enable signal when the throttle position is less than the throttle position minimum. The monitor ceases monitoring of the maximum error and the minimum error if the third comparator ceases to generate the second diagnostic enable signal during the monitoring period.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
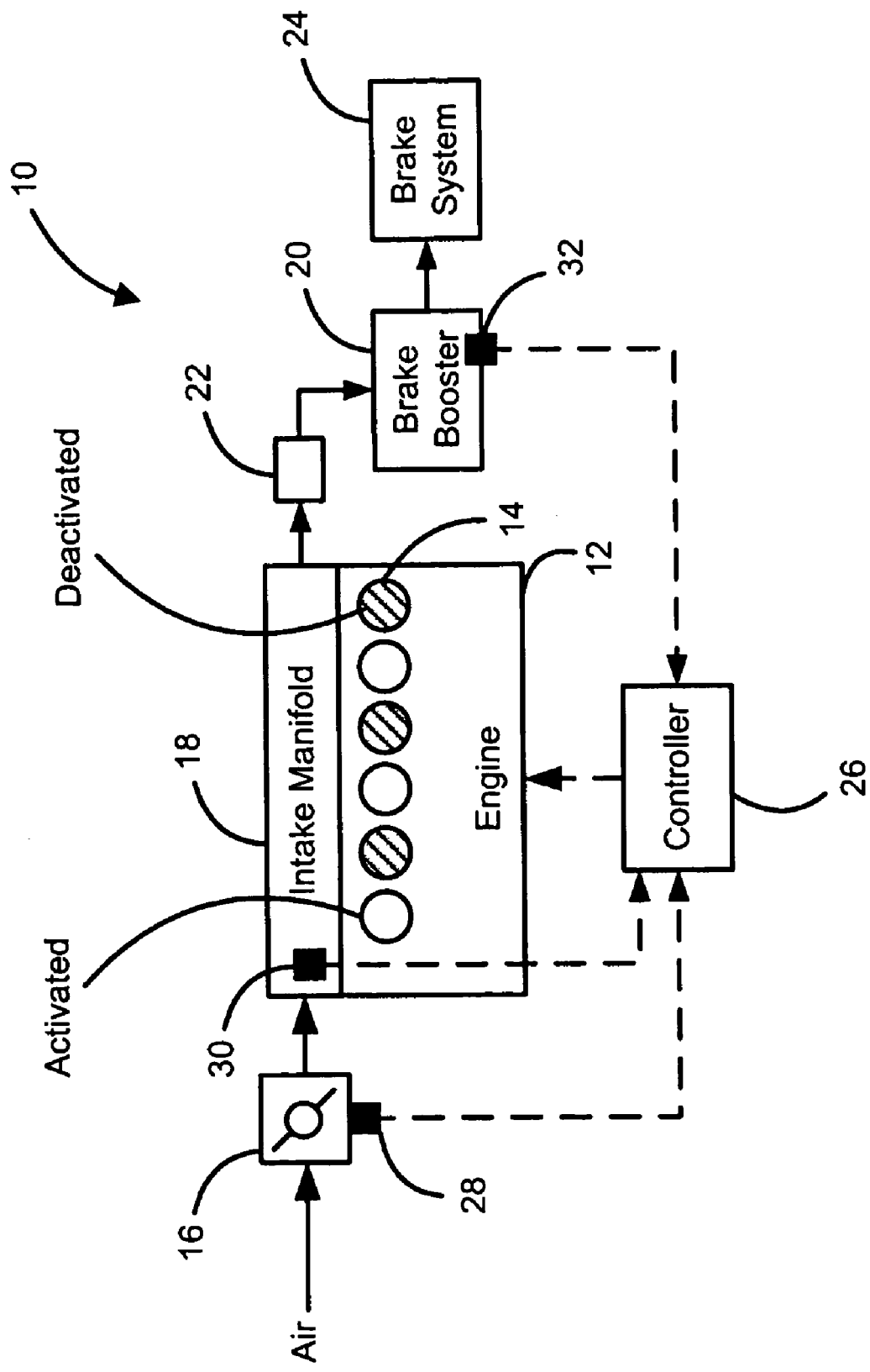
FIG. 1 is a schematic illustration of a vehicle including a brake boost sensor diagnostic according to the present invention.

The following description of the preferred embodiment is merely exemplary in nature and is in no way intended to limit the invention, its application, or uses. For purposes of clarity, the same reference numbers will be used in the drawings to identify similar elements.

Referring now to FIG. 1, a vehicle 10 includes an engine 12. The engine 12 includes N cylinders 14 that are selectively deactivated during engine operation. Although FIG. 1 depicts six cylinders (N=6), it can be appreciated that the engine 12 may include additional or fewer cylinders 14. For example, engines having 4, 5, 6, 8, 10, 12 and 16 cylinders are contemplated. Air flows into the engine 12 through a throttle 16 and an intake manifold 18 and is combusted with fuel in the cylinders 14.

A brake booster 20 is in selective fluid communication with the engine 12 through a check valve 22. The brake booster 20 stores vacuum pressure supplied by the engine 12 to assist braking effort of a brake system 24. More particularly, the brake booster 20 applies additional force to a master cylinder (not shown) of the brake system 24 to reduce braking effort. The check valve 22 is a one-way valve that enables flow of air to the intake manifold 18 from the brake booster 20 when an engine vacuum ($V_{ENG}$) is greater than a brake booster vacuum ($V_{BOOST}$). Flow of pressurized air to the brake booster 20 from the intake manifold 18 is prohibited by the check valve 22. In this manner, $V_{BOOST}$ is maintained within the brake booster 20.

A controller 26 communicates with the engine 12, a throttle position sensor 28, a manifold absolute pressure (MAP) sensor 30 and a brake booster vacuum sensor 32. The controller 26 receives a signal from the throttle position sensor 28 indicative of the degree to which the throttle 16 is open (i.e., 0–100%). The MAP sensor 30 generates a signal indicative of the pressure within the intake manifold 18 and the brake booster vacuum sensor 32 generates a signal indicative of $V_{BOOST}$. Observation of the brake booster signal indicates that the most common and predictable condition for the $V_{BOOST}$ to be replenished is when the throttle position is within a predetermined range of 0%. This is because higher $V_{ENG}$ is achieved when the throttle 28 is closed. $V_{ENG}$ is determined from a look-up table based on the throttle position signal and the MAP signal.

During periods of light engine load, the controller 26 communicates with the engine 12 to enable displacement on demand (DOD). DOD occurs via deactivation of one or more cylinders 14. In an exemplary embodiment, N/2 cylinders 14 are deactivated. Upon deactivation of the cylinders 14, the controller 26 communicates with the engine 12 to increase the power output of the remaining cylinders 14.

Figure 2:
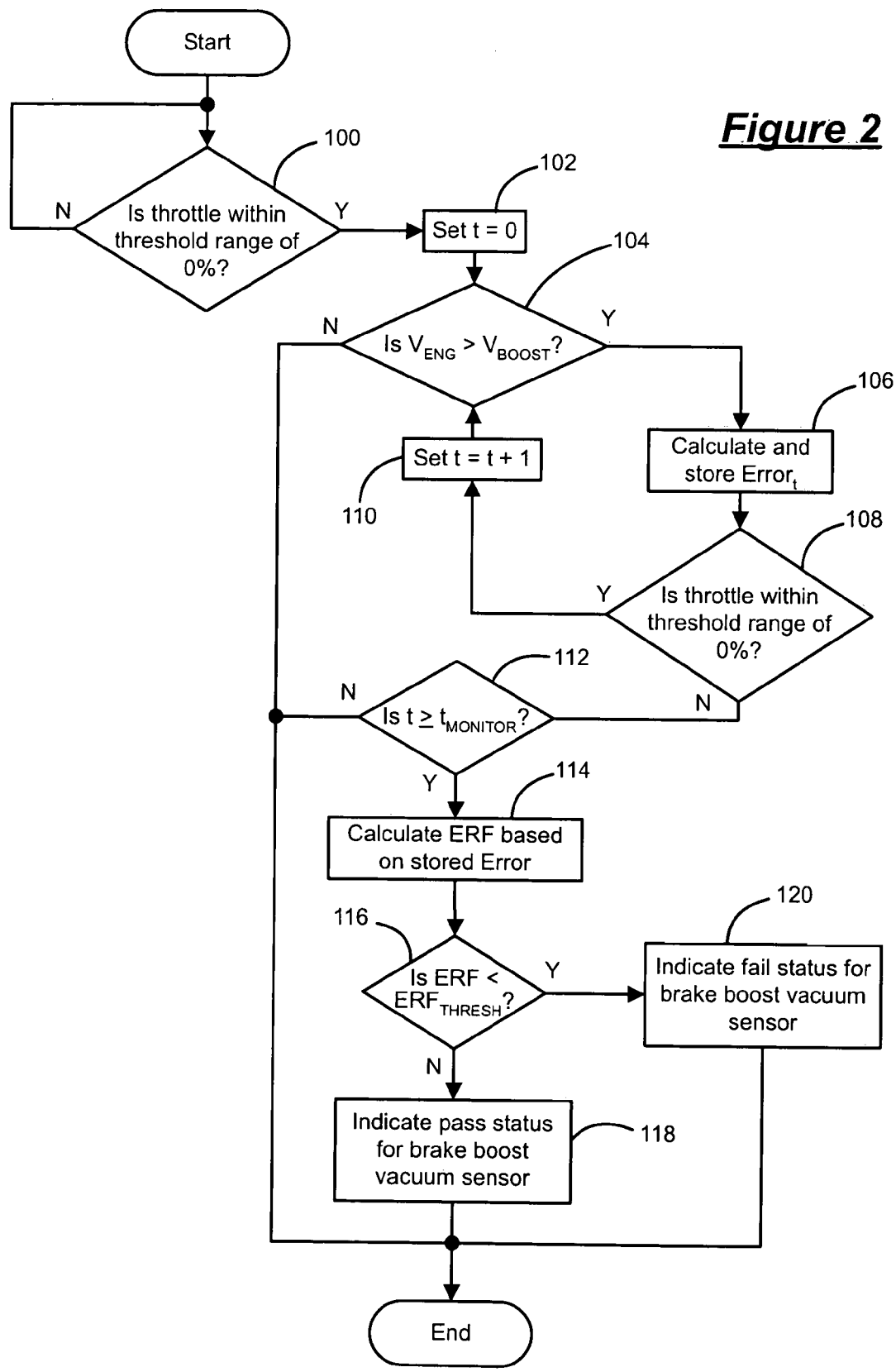
FIG. 2 is a flowchart illustrating the brake booster sensor diagnostic.

Referring now to FIG. 2, the diagnostic for the brake booster sensor will be described in detail. In step 100, control determines whether the throttle is within a predetermined range of 0% based on the throttle position signal. An exemplary predetermined range is preferably less than 2%. If the throttle is not within the predetermined range of 0%, control loops back. If the throttle is within the predetermined range of 0%, control sets a timer t equal to zero in step 102.

In step 104, control determines whether $V_{ENG}$ is greater than $V_{BOOST}$. If $V_{ENG}$ is not greater than $V_{BOOST}$, control ends. If $V_{ENG}$ is greater than $V_{BOOST}$, control continues in step 106. In step 106, control calculates and stores an error at the time t ($Error_t$). The error is the difference between $V_{ENG}$ and $V_{BOOST}$ at time t. In step 108, control determines whether the throttle is still within the predetermined range of 0%. If the throttle 16 is not within the predetermined range of 0%, control continues in step 112. If the throttle 16 is within the predetermined range of 0%, control increments the timer in step 110 and continues in step 104. In this manner, if the throttle 16 is actuated during monitoring of the error, the brake booster sensor diagnostic stops calculating $Error_t$. An exemplary timer increment is 100 ms. Using the exemplary values, the error is determined every 100 ms until achieving 1 s.

Control determines whether the timer has achieved a monitoring time ($t_{monitor}$) in step 112. If the timer has not achieved $t_{monitor}$, control ends. If the timer has achieved $t_{monitor}$, the monitoring period was sufficient and control continues in step 114. $t_{monitor}$ is chosen to provide sufficient time for $V_{BOOST}$ to increase until it is at least equivalent to $V_{ENG}$. An exemplary value for $t_{monitor}$ is 1 s. In step 114, control determines an error reduction fraction (ERF) based on the stored error data. More particularly, control reviews the stored error data and identifies a maximum error value ($Error_{max}$) and a minimum error value ($Error_{min}$) for the stored error values. The ERF is calculated based on the following formula:

$$ERF = \frac{Error_{max} - Error_{min}}{Error_{max}}$$

In step 116, control determines whether ERF is less than an ERF threshold ($ERF_{THRESH}$). An exemplary threshold is 1. If $V_{ENG}$ is initially greater than $V_{BOOST}$, then the check valve 22 enables the flow of pressurized air from the brake booster 20 until $V_{BOOST}$ is equal to $V_{ENG}$. Thus, $Error_{max}$ should occur near the beginning of the predetermined time and $Error_{min}$ will go to zero if the brake booster sensor 32 is functioning properly. Therefore, if the brake boost sensor 32 is functioning properly, ERF should be equal to or close to one. If ERF is close to or equal to one, control continues in step 118 to indicate a pass status for the brake booster sensor 32 and control ends. If ERF is less than a calibration value from $ERF_{THRESH}$, control continues in step 120 to indicate a fail status for the brake booster sensor 32 and control ends.

Figure 3:
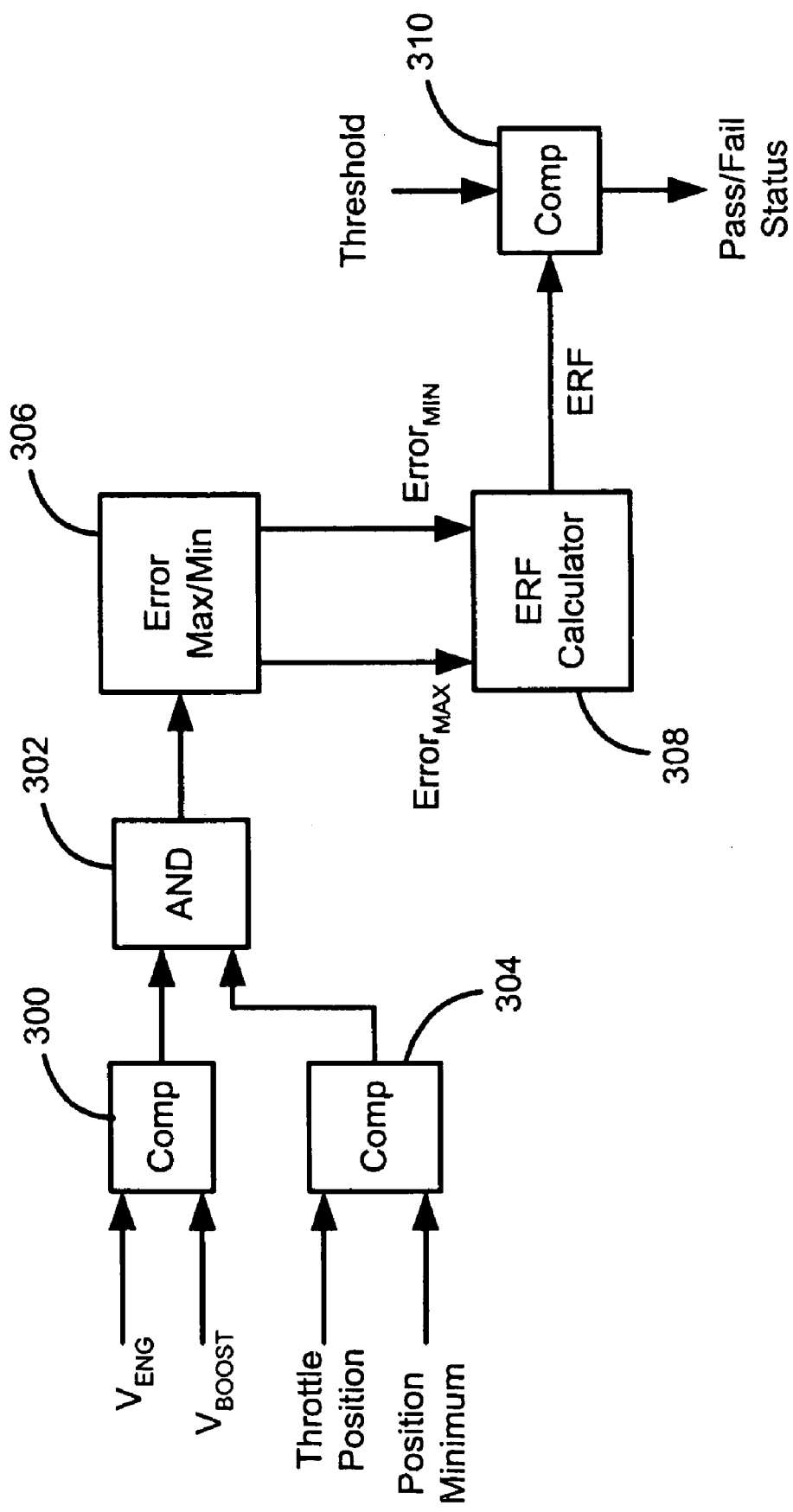
FIG. 3 is a schematic illustration of a logic flow of the brake booster sensor diagnostic.

Referring now to FIG. 3, a logic flow for the brake booster sensor diagnostic is schematically illustrated. A first comparator 300 compares $V_{ENG}$ and $V_{BOOST}$ to enable the diagnostic. If the difference between $V_{ENG}$ and $V_{BOOST}$ is greater than zero (i.e., $V_{ENG}$ is greater than $V_{BOOST}$), the first comparator 300 sends an enable signal to an and gate 302. A second comparator 304 compares the throttle position to a position minimum to determine if the throttle position is within the predetermined range of 0%. If the throttle position is within the predetermined range of 0%, the second comparator 304 sends an enable signal to the and gate 302. The and gate 302 outputs a diagnostic enable signal to the error max/min monitor 306 if it receives enable signals from both the first and second comparators 300,304

The error max/min monitor 306 calculates the error over the monitoring period ($t_{monitor}$) and identifies the $Error_{MAX}$ and $Error_{MIN}$ values. If the enable signal from the second comparator 304 ceases during $t_{monitor}$, the diagnostic is aborted. Upon the expiration of the enable criteria, the error max/min monitor 306 outputs $Error_{MAX}$ and $Error_{MIN}$ to an ERF calculator 308 if the actual monitoring time is greater than $t_{monitor}$. The ERF calculator calculates ERF based on the formula provided above and outputs the ERF value to a third comparator 310. The third comparator 310 compares the ERF value to the threshold and outputs a pass or fail status signal based thereon. If the ERF is less than the threshold value (e.g., 1), a fail status signal is output. If the ERF is equal to the threshold value (e.g., 1), a pass status signal is output.

The brake booster sensor diagnostic of the present invention enables the controller 26 to determine whether the brake booster sensor 32 is properly functioning. In this manner, control can ensure that adequate vacuum is supplied to the brake booster 20 for braking. The diagnostic is particularly useful in DOD engines. For example, a faulty brake booster sensor may prevent the engine from deactivating the cylinders (i.e., go into DOD mode) and/or may cause an engine to irrationally cycle in and out of DOD mode.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A diagnostic system for a brake booster sensor, comprising:
   a monitor that monitors a maximum error and a minimum error based on a brake booster sensor signal over a monitoring period; and
   a first comparator that determines one of a pass status and a fail status of said brake booster sensor based on said maximum error and said minimum error.

2. The diagnostic system of claim 1 further comprising an error reduction fraction (ERF) calculator that determines an ERF based on said maximum error and said minimum error.

3. The diagnostic system of claim 2 wherein said first comparator compares said ERF to a threshold to determine one of said pass status and said fail status.

4. The diagnostic system of claim 3 wherein if said ERF is less than said threshold, said first comparator generates a fail status signal.

5. The diagnostic system of claim 3 wherein if said ERF is equal to said threshold, said first comparator generates a pass status signal.

6. The diagnostic system of claim 1 further comprising a second comparator that generates a first diagnostic enable signal based on an engine vacuum and a brake booster vacuum.

7. The diagnostic system of claim 6 wherein said second comparator generates said first diagnostic enable signal if said brake booster vacuum is less than said engine vacuum.

8. The diagnostic system of claim 6 further comprising a third comparator that generates a second diagnostic enable signal based on a throttle position and a throttle position minimum.

9. The diagnostic system of claim 8 wherein said third comparator generates said second diagnostic enable signal when said throttle position is less than said throttle position minimum.

10. The diagnostic system of claim 8 wherein said monitor ceases monitoring of said maximum error and said minimum error if said third comparator ceases to generate said second diagnostic enable signal during said monitoring period.

11. A method of evaluating operation of a brake booster sensor of a vehicle brake booster, comprising:
determining whether an engine vacuum is greater than a brake booster vacuum;
monitoring an error reduction fraction if said engine vacuum is greater than said brake booster vacuum;
indicating a pass status for said brake booster sensor if said error reduction fraction achieves a predetermined level; and
indicating a fail status for said brake booster sensor if said error reduction fraction is below said predetermined level.

12. The method of claim 11 further comprising determining a throttle position, wherein said monitoring occurs when said throttle position is within a predetermined range of 0%.

13. The method of claim 11 further comprising:
determining an intake manifold absolute pressure (MAP); and
determining a throttle position, wherein said engine vacuum is based on said MAP and said throttle position.

14. The method of claim 11 further comprising calculating said error reduction fraction based on a maximum difference between said engine vacuum and said brake booster vacuum and a minimum difference between said engine vacuum and said brake booster vacuum within a predetermined time.

15. The method of claim 11 further comprising enabling fluid flow to an engine from said brake booster when said engine vacuum is greater than said brake booster vacuum.

16. A vehicle having a sensor diagnostic system, comprising:

a displacement on demand (DOD) engine having an intake manifold and a plurality of cylinders;
a brake booster that is in selective communication with said intake manifold; and
a controller that determines whether an engine vacuum is greater than a brake booster vacuum, that monitors an error reduction fraction if said engine vacuum is greater than said brake booster vacuum, that indicates a pass status for a brake booster sensor if said error reduction fraction achieves a predetermined level and that indicates a fail status for said brake booster sensor if said error reduction fraction is below said predetermined level.

17. The vehicle of claim 16 wherein said error reduction fraction is determined over a minimum time and is based on a maximum difference between said engine vacuum and said brake booster vacuum and a minimum difference between said engine vacuum and said brake booster vacuum within said minimum time.

18. The vehicle of claim 16 further comprising:
a manifold absolute pressure (MAP) sensor that generates a MAP signal for said intake manifold;
a throttle that regulates air flow into said intake manifold; and
a throttle position sensor that generates a throttle position signal.

19. The vehicle of claim 18 wherein said engine vacuum is based on said MAP signal and said throttle position signal.

20. The vehicle of claim 16 further comprising:
a conduit that interconnects said intake manifold and said brake booster; and
a check valve that selectively enables fluid communication between said intake manifold and said brake booster.

21. The vehicle of claim 20 wherein said valve enables fluid communication between said intake manifold and said brake booster when said engine vacuum is greater than said brake booster vacuum.

22. The vehicle of claim 16 further comprising:
a throttle that regulates air flow into said intake manifold; and
wherein said controller monitors said error reduction fraction when said throttle is within a predetermined range of a closed state.

23. The vehicle of claim 22 further comprising a throttle position sensor that generates a throttle position signal, wherein said predetermined range of said closed state is determined based on said throttle position signal.

24. The vehicle of claim 16 wherein said DOD engine is operable in a first mode having all of said plurality of cylinders activated and a second mode having a portion of said plurality of cylinders activated.

25. The vehicle of claim 24 wherein said DOD engine switches from said second mode to said first mode when said engine vacuum is greater than said brake booster vacuum.

* * * * *